(No Model.)

J. H. SEIDEL.
CAR COUPLING.

No. 485,232. Patented Nov. 1, 1892.

Witnesses
Edwin L. Bradford
Frank H. Thatcher

Inventor
Joseph H. Seidel
By Patrick O'Farrell
Attorney

UNITED STATES PATENT OFFICE.

JOSEPH H. SEIDEL, OF PHILADELPHIA, PENNSYLVANIA.

CAR-COUPLING.

SPECIFICATION forming part of Letters Patent No. 485,232, dated November 1, 1892.

Application filed June 1, 1892. Serial No. 435,150. (No model.)

*To all whom it may concern:*

Be it known that I, JOSEPH H. SEIDEL, a citizen of the United States of America, residing at Philadelphia, in the county of Philadelphia and State of Pennsylvania, have invented certain new and useful Improvements in Car-Couplings, of which the following is a specification, reference being had therein to the accompanying drawings.

My invention relates to car-couplings; and it consists in the novel construction and combination of the several parts, as hereinafter specified.

Figure 1:
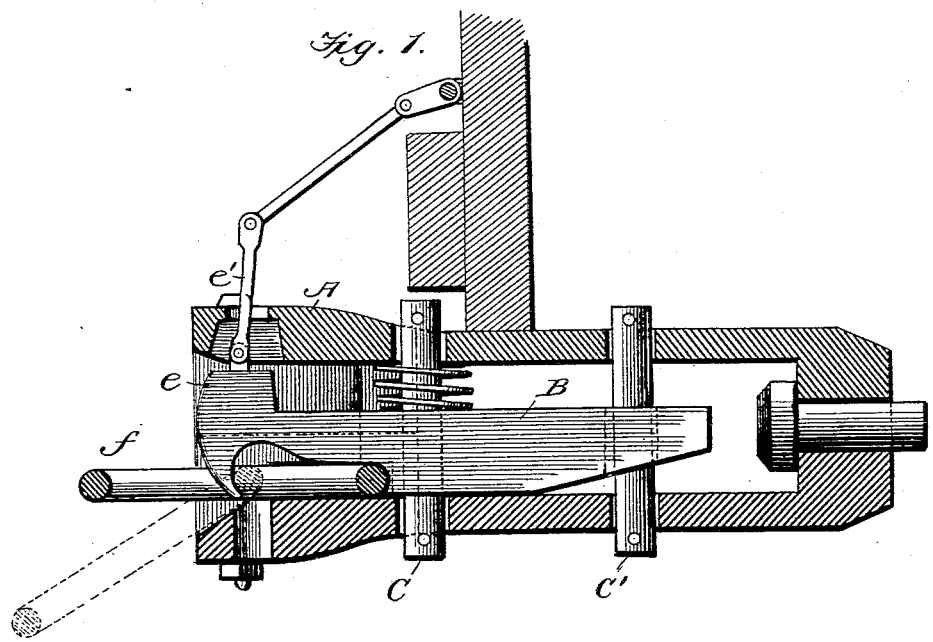
Figure 2:
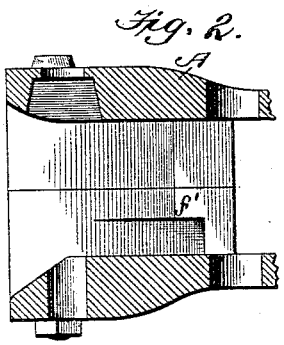

In the accompanying drawings, Figure 1 is a longitudinal section of my improved coupling. Fig. 2 is a fragmentary view showing a groove on the inside of the draw-head to support the link and prevent its dropping below the entrance to the draw-head.

Referring to the drawings by letters of reference, A indicates a two-part draw-head connected by bolts, the adjacent sides of the two members being recessed, forming a rectangular opening with a flaring mouth. Into the opening thus formed is placed a coupling-hook B, which is provided with perforations to receive the bolts C C', the perforations being elongated to admit of the movement of the hook in coupling and uncoupling. The hook B is provided on its forward end with an upwardly-projecting part $e$, to which is pivotally connected a link $e'$, that extends through a perforation in the draw-head and unites with a system of levers by which the hook is operated; but as these levers form no part of my invention it is not necessary to describe them here. The lower portion of the draw-head is also perforated in line with the perforations through which link $e'$ passes. This is done to admit of the use of an ordinary coupling-pin should the hook B or its connections get out of order or for any reason become inoperative. The hook B has its rear end beveled off from beneath to permit it to be more easily raised when uncoupling, and a spiral spring is placed round the front bolt and between the hook-shank and the upper part of the draw-head, which serves to keep the hook in normal position when not raised by the link $e'$ and its connections. Immediately back of the flaring mouth and upon the sides of the lower part of the draw-head there are formed grooves $f'$, which are intended to hold the link $f$ in place when the cars are of a uniform height.

Having thus described my invention, what I claim as new, and desire to secure by Letters Patent, is—

The within-described car-coupler, consisting of the two-part draw-head perforated in vertical line and provided with a flaring mouth terminating on the lower part of the draw-head in side grooves for the holding of the link, in combination with a coupling-hook having perforations and secured in the rectangular opening formed between the two sections of the draw-head by bolts and held to normal position by a suitable spring, substantially as described.

In testimony whereof I affix my signature in presence of two witnesses.

JOSEPH H. SEIDEL.

Witnesses:
JOHN ISCHI,
JOHN J. WEYAND.